Dec. 10, 1935.                D. C. WRIGHT                 2,024,019
                    ELECTRIC WELD CONTROLLING DEVICE
                Filed Aug. 20, 1932         2 Sheets-Sheet 1

INVENTOR
David C. Wright,
BY
Justin W. Macklin,
ATTORNEY

Dec. 10, 1935.  D. C. WRIGHT  2,024,019
ELECTRIC WELD CONTROLLING DEVICE
Filed Aug. 20, 1932  2 Sheets-Sheet 2

INVENTOR
David C. Wright,
BY
Justin W. Macklin,
ATTORNEY

Patented Dec. 10, 1935

2,024,019

UNITED STATES PATENT OFFICE 2,024,019

ELECTRIC WELD CONTROLLING DEVICE

David C. Wright, Euclid, Ohio, assignor to The Electric Controller & Manufacturing Company, Cleveland, Ohio, a corporation of Ohio Application August 20, 1932, Serial No. 629,643

37 Claims. (Cl. 219—4)

My invention relates to automatic electric weld controlling devices, and more particularly to such a device adapted to regulate the flow of welding current to produce welds of uniform character in materials of varying thickness, surface condition, etc.

The nature of my invention may be best understood from a discussion of one application of it, for example, to the spot welding of metals. In the spot welding of like parts in quantity production it is highly desirable that the heat applied to successive welds be kept as nearly uniform as is possible, so that the structure of the metal in the weld be kept uniform, thereby insuring the same degree of reliability in all welds. It is well recognized that in quantity production work this is difficult to attain, as some of the pieces to be welded together are coated with a film of oxide or other substance while others are bright and clean; also there are frequent variations of thickness of the metal to be welded. It will be obvious that in the case of unclean pieces the resistance of the pieces at the weld will be high and the flow of current consequently low. In the case of clean pieces the resistance at the weld will be low and the flow of the current therefore high. In control devices now used in this connection the time of current flow is generally maintained constant, with the result that the weld with unclean surfaces is made with a low value of current for too short a time, and the weld with clean surfaces is made with too high a current for too long a time. Obviously, such welds cannot possess uniform characteristics.

In a similar manner, if the thicknesses of a series of welds vary, as for example, if the first weld is between two $\tfrac{1}{16}''$ thick pieces, the next between a $\tfrac{1}{16}''$ thick and a $\tfrac{3}{32}''$ thick piece, the next between two $\tfrac{1}{8}''$ thick pieces, etc., it will be obvious that if the same welding machine is used a constant time setting for current flow it will not produce the best results, as the thin pieces will receive too much heat and the thick pieces too little.

In the arrangement shown illustrating my invention, I provide means responsive to the current magnitude for automatically adjusting the time to suit the current value. Thus in the cases just discussed, instead of maintaining a constant period of current flow in all cases, I provide apparatus which limits the higher current values for a relatively shorter time than for the lower current values. In other words, my device can be adjusted for a series of weld operations, so that the time of current flow is approximately inversely proportional to the magnitude of current, that is, the ampere-seconds, or energy, may be kept constant or nearly so.

The desirability and advantages of such an invention will be readily apparent. Wherever the energy output of a circuit is to be maintained approximately constant for intermittent applications, my invention is applicable.

Generally stated then, it is an object of my invention to provide a timing device which is responsive to current flow in a circuit and which interrupts the flow according to the current magnitude.

Another object is to provide a timing device which interrupts a circuit after a predetermined amount of energy has passed through it.

A further object is to provide a device for permitting the flow of current in a circuit for a period of time approximately inversely proportional to the current magnitude.

A still further object is to provide a timing device which may be suitably adjustable for providing a wide range of time and current relationships.

A still further object is to provide a timing device having no rotating parts and comprising apparatus mainly of a stationary character.

Yet another object is to provide a construction which is easily manufactured at a low cost, and which can be assembled in a neat and compact form.

Further and more specific objects will be apparent as my invention is more fully disclosed.

With reference to the attached drawings.

Figure 1:
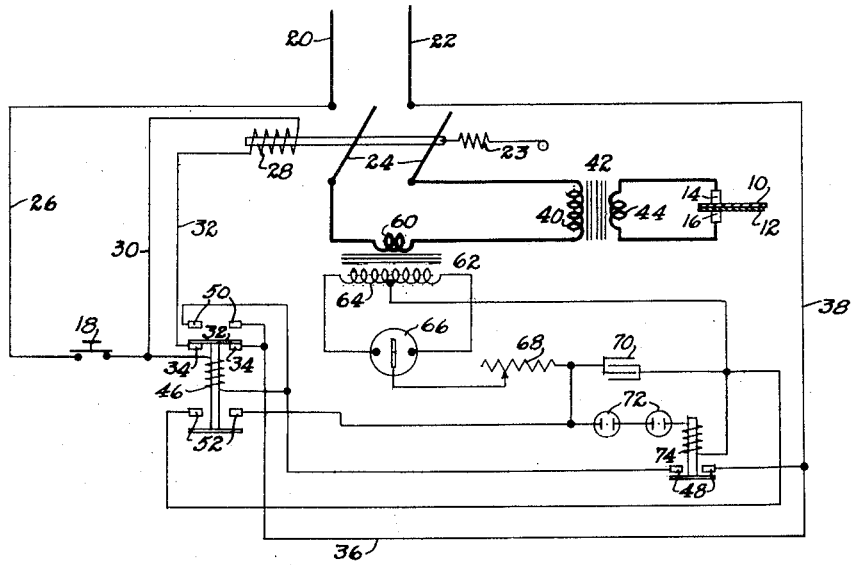
Fig. 1 is a diagrammatic sketch of a circuit embodying my invention, for controlling the application of current to a weld.

Briefly considered, a form of my invention illustrated in Fig. 1 comprises a condenser 70 having a definite time lag connected in series with a variable resistance 68 and then across the secondary terminals of a series transformer 62 through a double-wave rectifying device 66, the primary of the series transformer 62 being connected in a suitable power supply circuit, such for example as a circuit supplying alternating current, so that current variations in this circuit are manifested across the aforementioned condenser as voltage variations which, at a predetermined value and after the elapse of a definite time interval depending on the magnitude of the current in the power supply circuit, will arc over neon tubes 72 shunted across the condenser 70 and thereby actuate a relay 74 to cause opening of the power supply circuit.

In Fig. 1 metal plates 10 and 12, shown in fragmentary section, are arranged between spot welding electrodes 14 and 16, preparatory to being welded together. To initiate the welding operation push button 18 is pressed and held down, thereby closing a circuit from supply line 20, through conductor 26, push button 18, conductor 30, closing coil 28 of switch 24, conductor 32, normally closed contacts 34, conductors 36 and 38, to the other supply line 22, thereby closing the main switch 24, which is normally held open by spring 23, and energizing the primary winding 40 of shunt transformer 42. Energy is inductively transferred to the secondary winding 44 and thence to the plates 10 and 12 through the electrodes 14 and 16.

Connected in the circuit energizing the primary winding 40 is another primary winding 60 of a series transformer 62. As the current passing through plates 10 and 12 increases, a corresponding change is reflected in that passing through primary winding 60, which causes a voltage to be induced in secondary winding 64 proportional to the current flowing in the primary winding 60. The ends of the secondary winding 64 are connected to a rectifying device 66 in such a manner as to produce a unidirectional voltage by double-wave rectification of the voltage delivered by the secondary winding 64. Between the mid-point of the secondary winding 64 and the rectifying device 66 are connected in series an adjustable resistance 68 and a condenser 70, which complete the circuit for a unidirectional current resulting from the rectification of the delivered voltage from secondary winding 64. Shunted across condenser 70 are neon tubes 72 and a low energy consuming relay 74 connected in series. The characteristic of the neon tubes of importance is that they will pass no current until a voltage sufficiently high to break down the gas in the tubes is impressed on the tube electrodes. As the welding current increases, the voltage delivered by the secondary winding 64 increases, and consequently that impressed across condenser 70. When after a time interval, dependent upon the setting of resistance 68, the voltage across condenser 70 reaches a predetermined value, the gas in the neon tubes becomes conducting and current flows from the condenser 70 through the neon tubes 72, the relay 74 and back to the condenser 70 or vice versa, thereby causing the relay 74 to close contacts 48. A circuit is then formed from the supply line 20, through conductor 26, push button 18, solenoid 46, contacts 48, conductor 38, to the other supply line 22, which causes the solenoid 46 to become energized and open contacts 32 and close contacts 50 and 52. Opening of contacts 32 causes the main switch 24 to open, thereby interrupting the welding current. At the same instant, the closing of contacts 52 short-circuits the condenser 70, thereby reducing its voltage to zero and de-energizing the relay 74, opening contacts 48. The closing of contacts 50 maintains the energization of solenoid 46, which would otherwise be de-energized by the opening of contacts 48. The welding has now been completed and the push button 18 may be released.

Figure 3:
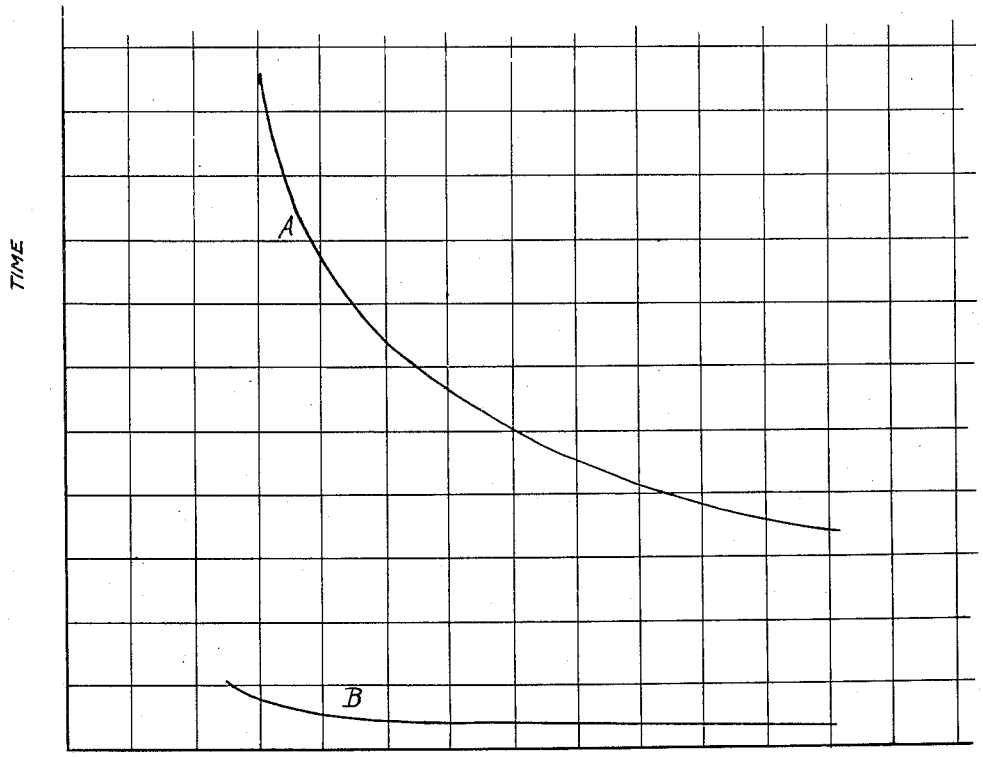
Fig. 3 is a graph showing that a wide range of current-time relationships may be obtained with the device.

The timing of the application of the welding current may be varied in several ways. The setting of the device for a given series of welds is accomplished by adjusting the variable resistance 68. If the resistance 68 is comparatively high a time-current characteristic such as is represented by the curve A in Fig. 3 may be obtained. If the resistance 68 is comparatively low a time-current characteristic such as is represented by the curve B may be obtained. It will be obvious that intermediate of these two characteristics an infinite number of time-current characteristics are obtainable.

The time-current characteristic for any given resistance setting may be changed by changing the condenser 70. It is well known that the time lag, or charging time, of a condenser, depends on the capacitance rating of the condenser. A condenser of high capacitance will have a longer charging period; a condenser of low capacitance will have a shorter charging period. The time lag or charging time of the condenser is, of course, greater than that of the resistance. Thus it is possible without departing from the spirit and scope of my invention, to make the condenser 70 variable, or to construct it of sections, so that by cutting sections in or out the capacitance may be varied and hence the time-current characteristic of the device.

It is also possible to vary the time of welding by changing the number of neon tubes 72 shunted across the condenser 70. While I have shown only two tubes in the several figures, any other suitable number may be used. For example, if a single neon tube shunted across condenser 70 becomes conducting when the condenser voltage reaches 40 volts, it will be obvious that if two neon tubes are used the condenser voltage must be 80 volts, and for three tubes 120 volts, and so on. Since it takes longer for the condenser 70 to reach higher voltages than for lower voltages, the time of application of the welding current will be longer.

Still another way of varying the time of welding is by varying the magnitude of the voltage impressed on condenser 70 and resistance 68. The higher this voltage, the quicker the condenser 70 will reach the voltage at which the neon tubes become conducting, the reverse being the case for lower impressed voltages. This impressed voltage may be varied by placing taps in the secondary winding 64 and switching between these taps for the desired timing. Or, the whole secondary winding 64 may be inductively variable with respect to the primary winding 60, as in an induction regulator. Thus for a given current flowing in the primary winding 60 a correspondingly lower or higher voltage may be delivered by the secondary winding 64 to the condenser 70 and resistance 68, by one of the variable methods just described.

It will be apparent that any one, all, or a combination of the methods just described may be used to establish the desired time-current characteristic. Further, it will be apparent that after the setting for a desired time-current characteristic has been made that a series of welding operations may be carried out without further adjustments, as the voltage across condenser 70 at all times varies with the current flowing in the welding circuit.

Figure 4:
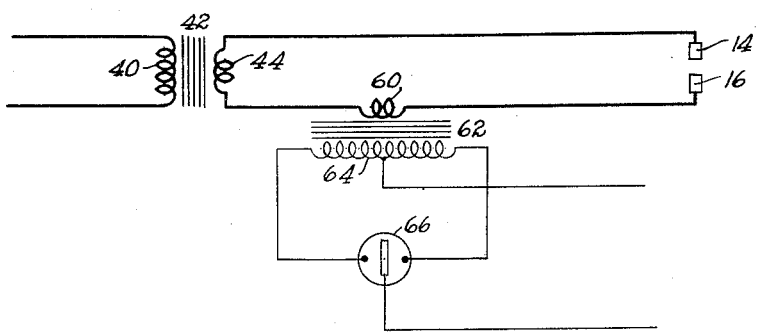
Fig. 4 is a partial diagrammatic sketch showing another arrangement of some of the parts in Figs. 1 and 2.

The primary winding 60 need not be placed in the primary circuit of shunt transformer 42 to be effective, but may be placed in the secondary circuit as well, as shown in Fig. 4. The other parts of the device not shown in this figure are connected as in Fig. 1.

Figure 2:
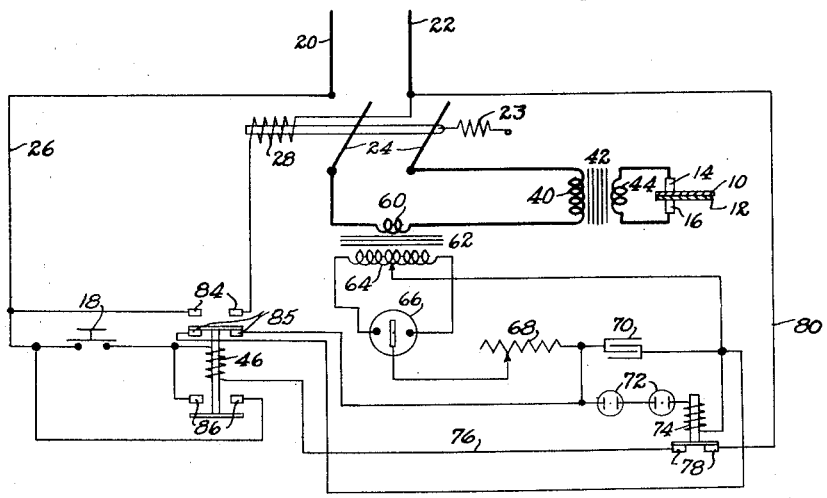
Fig. 2 is a similar diagrammatic sketch with a slightly different initiating circuit arrangement.

In Fig. 2 is shown a diagrammatic arrangement similar to that in Fig. 1, but with circuits arranged so that it is unnecessary to hold the push button 18 down during the welding operation. The push button 18 is pressed down to complete a circuit from the supply line 20, through conductor 26, push button 18, solenoid 46, conductor 76, normally-closed contacts 78, conductor 80, to supply line 22, thereby energizing solenoid 46 which opens contacts 85 removing the short-circuit from condenser 70, and closes contacts 84 and 86. Closing contacts 84 energizes closing coil 28 which closes switch 24, thereby supplying current to the pieces to be welded together. Closing contacts 86 establishes a circuit around the push button 18 to the solenoid 46 and it is therefore not necessary to hold the push button 18 down. When after a time interval the voltage across condenser 70 reaches a value great enough to arc over the neon tubes 72, the relay 74 opens the contacts 78 and the solenoid 46 is deenergized, thereby opening the switch 24. Subsequent welding operations are performed in a like manner.

While I have described my invention with reference to specific apparatus and the specific application of welding, it is to be understood that many modifications and applications of it may be made without departing from the spirit or scope of the appended claims.

I claim:

1. The combination with electrodes for welding metals together, a source of current supply, and a circuit for bringing the current to the electrodes, of means responsive to said current for producing a voltage effect substantially proportional thereto, means responsive to said voltage effect for causing interruption of said current to the electrodes, and means rendering said voltage effect ineffective for a period of time approximately inversely proportional to the value of said current.

2. The combination with electrodes for welding metals together, a source of current supply, and a circuit for bringing the current to the electrodes, of means responsive to the current in said circuit for producing a voltage substantially proportional thereto, means responsive to a current produced by said voltage for causing interruption of said current to the electrodes, and means preventing the establishing of a current by said voltage for a time approximately inversely proportional to the value of said current to the electrodes.

3. The combination with electrodes for welding metals together, and a circuit for supplying current thereto, of means responsive to current in said circuit for producing a voltage substantially proportional thereto, means responsive to a current produced by said voltage adapted to interrupt the flow of current to said electrodes, means preventing the flow of current produced by said voltage for a period of time approximately inversely proportional to the value of said current to the electrodes, and means for varying said period.

4. The combination with electrodes for spot-welding metal parts together, a source of current supply, and a circuit for delivering the current to said electrodes, said current varying with the current-consuming characteristics of the parts to be welded together, of means responsive to said current for producing a voltage effect corresponding to the current-consuming characteristics of the parts to be welded together, and means including a relay circuit controlled by said last mentioned means for sustaining, said current to the weld for a period of time dependent upon said current-consuming characteristics said relay circuit being deenergized until said current has reached a predetermined value.

5. The combination with a pair of welding electrodes adapted to present an electric current to parts to be welded together, and means for supplying current to said electrodes, of means for interrupting said current responsive substantially inversely to the magnitude of said current, said means embodying a normally non-conducting gas-filled device in series with a relay and adapted to become conducting to energize said relay to cause said interrupting of said current when a voltage of predetermined value corresponding to the magnitude of said current is impressed on its terminals.

6. The combination with a pair of welding electrodes adapted to present an electric current to parts to be welded together, and means for supplying electric current to produce the welds, of means responsive to said current for producing a unidirectional voltage substantially proportional to said current, the value of said current being determined by the condition and thickness of the parts to be welded, a condenser adapted to have a current flow through it caused by said unidirectional voltage to produce a voltage drop within said condenser, a neon tube and a relay associated with said condenser, said neon tube being adapted to become conducting to energize said relay to cause said current to be welded to be interrupted when the voltage drop in said condenser reaches a predetermined value.

7. In an electrical welding timing device the combination of means responsive to the flow of alternating current for producing a unidirectional voltage substantially proportional to said alternating current, circuit means adapted to admit a current caused by said unidirectional voltage, said circuit means including a capacity element and a resistance element adapted to permit a voltage to be established across said capacity element with a definite time delay and proportional to said unidirectional voltage, and means responsive to a predetermined value of said voltage across said capacity element for discontinuing the flow of said alternating current.

8. The combination with a pair of welding electrodes, and means for presenting welding current to said electrodes, of means responsive to said welding current for producing a unidirectional voltage substantially proportional to said current, circuit means for admitting a current caused by said unidirectional voltage, said circuit means including a condenser and a resistance adapted to delay the voltage rise within said condenser consequent upon the flow of said latter current, a valvular gas-filled device associated with said condenser adapted to by-pass current around said condenser when said voltage rise within said condenser reaches a predetermined value and thereby operate an auxiliary circuit to interrupt said welding current.

9. In a device of the character described the combination with a source of alternating current supply and means for spot-welding metals with current from said source of supply, of means responsive to the flow of said current for producing an alternating voltage proportional to said current, means for rectifying said alternating voltage to produce a unidirectional voltage, circuit means adapted to admit a current caused by said unidirectional voltage, said circuit means including a condenser and a resistance adapted to permit a voltage to be built up across said condenser proportional to said first mentioned current, a valvular by-pass device associated with said condenser adapted to by-pass current around said condenser consequent upon the voltage across said condenser reaching a predetermined value and thereby actuate the interruption of said welding current.

10. The combination with electrodes for welding metals together, and a circuit for supplying alternating current thereto, of means responsive to said alternating current for producing a unidirectional voltage substantially proportional thereto, and normally deenergized means responsive to a predetermined value of said unidirectional voltage, for interrupting said alternating current with a longer time delay at lower current values than at higher current values.

11. The combination with welding electrodes adapted to spot weld metal parts together, and circuit means for supplying alternating welding current to said electrodes, of means for producing an alternating voltage substantially proportional to said alternating current, means for rectifying said alternating voltage to produce a continuous unidirectional voltage of the same proportionality as said alternating voltage, a resistance device and a condenser device adapted to absorb said unidirectional voltage in unequal proportions thereof, said condenser device absorbing said voltage at a slower rate than said resistance device, and means controlled by the rate of voltage absorption of said condenser device for causing the interruption of said welding current.

12. The combination with a pair of welding electrodes, of a circuit for supplying varying current thereto, a control circuit inductively related to said first circuit and adapted to receive an inductive voltage therefrom corresponding to said current to said electrodes, a rectifying device disposed in said control circuit adapted to modify said inductive voltage to produce a unidirectional voltage corresponding to said inductive voltage, a resistance and a condenser disposed in said control circuit, said resistance and condenser being adapted to absorb said unidirectional voltage at definite rates, a by-pass circuit including a valvular gas-filled device and a relay, said by-pass circuit being connected to the terminals of said condenser, said valvular device being adapted to admit current to said by-pass circuit to energize said relay to interrupt said varying current to said electrodes when the voltage absorbed by said condenser reaches a predetermined value.

13. In a welding control apparatus the combination of, a circuit adapted to supply current to a weld, a control circuit inductively related to said supply circuit and adapted to receive an induced voltage therefrom, a potential absorbing condenser device in said control circuit, and means responsive to the potential absorbed by said device for automatically opening said supply circuit after a period of time approximately inversely proportional to the current in said circuit.

14. The combination of a current supply circuit, a control circuit inductively related to said supply circuit, a condenser device in said control circuit, and means whereby a potential is established across said condenser device approximately proportional to the current in said supply circuit, and means responsive to a predetermined value of said potential across said device for opening said supply circuit.

15. The combination of a current supply circuit, a control circuit inductively related to said supply circuit, a by-pass circuit shunting a portion of said control circuit, and means normally interrupting said by-pass circuit adapted to close the circuit after a period of time approximately inversely proportional to the value of current in said supply circuit.

16. In a circuit controller, a circuit to be controlled, a condenser associated therewith, means whereby the electrical condition of the condenser is varied in response to varying electrical conditions in said circuit, and means responsive to the electrical condition of the condenser for controlling said circuit.

17. In a circuit controller, a circuit to be controlled, a condenser associated therewith, means whereby the electrical condition of the condenser is varied in response to varying electrical conditions in said circuit, means responsive to the electrical condition of the condenser for controlling said circuit and for discharging the condenser.

18. In a circuit controller, a supply circuit, a condenser associated with said supply circuit, means whereby the electrical condition of the condenser is varied in response to varied electrical conditions in said supply circuit, and means responsive to the electrical condition of the condenser for controlling said supply circuit.

19. The combination of a current supply circuit, a condenser inductively asociated therewith, a by-pass circuit shunting said condenser, means normally interrupting said by-pass circuit adapted to close said by-pass circuit when said condenser has reached a certain electrical potential, and means responsive to closing of said by-pass circuit for reducing the potential of said condenser to a zero value.

20. In an electrical welding system, a main welding circuit, means for closing said circuit, a transformer connected to the said main circuit, a rectifier connected to said transformer, a control circuit connected to said rectifier, a condenser in said control circuit, an electric valve and an electro-responsive winding connected across said condenser, and means controlled by the energization of said electro-responsive winding for opening the main welding circuit and for discharging the condenser.

21. In a device of the class described, a source of electric current, a supply circuit for bringing said current to electrodes, a control circuit, means responsive to the current in the supply circuit for producing a voltage effect in said control circuit substantially proportional to the current in the supply circuit, means associated with the control circuit and operable responsive to the flow of current in a portion of the control circuit to control the flow of current in the supply circuit, the control circuit having means associated therewith and normally preventing the flow of current in said portion of the control circuit, said means being operable to permit the flow of current in said portion of the control circuit when a voltage corresponding to the voltage supplied to the control circuit is impressed thereon, the control circuit also having associated therewith a capacity element adapted to absorb current supplied to the control circuit for a time interval, the length of the time interval being approximately inversely proportional to the value of the current in the supply circuit, whereby the voltage impressed on the means preventing the flow of current in said portion of the control circuit is less than that supplied to the control circuit for a time interval, and whereby the means responsive to the flow of current in said portion of the control circuit is operable after a time interval, the length of the time interval being approximately inversely proportional to the value of the current in the supply circuit.

22. In a device of the class described, a source of electric current, a supply circuit for bringing said current to electrodes, a control circuit, means responsive to the current in the supply circuit for producing a voltage effect in said control circuit substantially proportional to the current in the supply circuit, means associated with the control circuit and operable responsive to the flow of current in a portion of the control circuit to control the flow of current in the supply circuit, the control circuit having means associated therewith and normally preventing the flow of current in said portion of the control circuit, said means being operable to permit the flow of current in said portion of the control circuit when a voltage corresponding to the voltage supplied to the control circuit is impressed thereon, the control circuit also having associated therewith a capacity element adapted to absorb current supplied to the control circuit for a time interval, the length of the time interval being approximately inversely proportional to the value of the current in the supply circuit, whereby the voltage impressed on the means preventing the flow of current in said portion of the control circuit is less than that supplied to the control circuit for a time interval, and whereby the means responsive to the flow of current in said portion of the control circuit is operable after a time interval, the length of the time interval being approximately inversely proportional to the value of the current in the supply circuit, and means to adjustably vary the capacity of the capacity element.

23. In a device of the class described, a source of electric current, a supply circuit for bringing said current to electrodes, a control circuit, means responsive to the current in the supply circuit for producing a voltage effect in said control circuit substantially proportional to the current in the supply circuit, means associated with the control circuit and operable responsive to the flow of current in a portion of the control circuit to control the flow of current in the supply circuit, the control circuit having means associated therewith and normally preventing the flow of current in said portion of the control circuit, said means being operable to permit the flow of current in said portion of the control circuit when a voltage corresponding to the voltage supplied to the control circuit is impressed thereon, the control circuit also having associated therewith a capacity element adapted to absorb current supplied to the control circuit for a time interval, and a resistance adapted to retard the rate of flow of current to the capacity element to increase the time interval during which the capacity element absorbs current, the length of the time interval being approximately inversely proportional to the value of the current in the supply circuit, whereby the voltage impressed on the means preventing the flow of current in said portion of the control circuit is less than that supplied to the control circuit for a time interval, and whereby the means responsive to the flow of current in said portion of the control circuit is operable after a time interval, the length of the time interval being approximately inversely proportional to the value of the current in the supply circuit.

24. In a device of the class described, a source of electric current, a supply circuit for bringing said current to electrodes, a control circuit, means responsive to the current in the supply circuit for producing a voltage effect in said control circuit substantially proportional to the current in the supply circuit, means associated with the control circuit and operable responsive to the flow of current in a portion of the control circuit to control the flow of current in the supply circuit, the control circuit having means associated therewith and normally preventing the flow of current in said portion of the control circuit, said means being operable to permit the flow of current in said portion of the control circuit when a voltage corresponding to the voltage supplied to the control circuit is impressed thereon, the control circuit also having associated therewith a capacity element adapted to absorb current supplied to the control circuit for a time interval and a resistance adapted to retard the rate of flow of current to the capacity element to increase the time interval during which the capacity element absorbs current, the length of the time interval being approximately inversely proportional to the value of the current in the supply circuit, whereby the voltage impressed on the means preventing the flow of current in said portion of the control circuit is less than that supplied to the control circuit for a time interval, and whereby the means responsive to the flow of current in said portion of the control circuit is operable after a time interval, the length of the time interval being approximately inversely proportional to the value of the current in the supply circuit, and means to adjustably vary the value of said resistance whereby the time interval during which the capacity element absorbs current is varied.

25. In a device of the class described, a source of electric current, a supply circuit for bringing said current to electrodes, a control circuit, means responsive to the current in the supply circuit for producing a voltage effect in said control circuit substantially proportional to the current in the supply circuit, means associated with the control circuit and operable responsive to the flow of current in a portion of the control circuit to control the flow of current in the supply circuit, the control circuit having means associated therewith and normally preventing the flow of current in said portion of the control circuit, said means being operable to permit the flow of current in said portion of the control circuit when a voltage corresponding to the voltage supplied to the control circuit is impressed thereon, the control circuit also having associated therewith a capacity element adapted to absorb current supplied to the control circuit for a time interval, the length of the time interval being approximately inversely proportional to the value of the current in the supply circuit, whereby the voltage impressed on the means preventing the flow of current in said portion of the control circuit is less than that supplied to the control circuit for a time interval, and whereby the means responsive to the flow of current in said portion of the control circuit is operable after a time interval, the length of the time interval being approximately inversely proportional to the value of the current in the supply circuit, and means operable consequent upon the flow of current in said portion of the control circuit to effect discharge of said capacity element.

26. In a device of the class described, a source of electric current, a supply circuit for bringing said current to electrodes, a control circuit, means responsive to the current in the supply circuit for producing a voltage effect in said control circuit substantially proportional to the current in the supply circuit, means associated with the control circuit and operable responsive to the flow of current in a portion of the control circuit to control the flow of current in the supply circuit, the control circuit having means associated therewith and normally preventing the flow of current in said portion of the control circuit, said means being operable to permit the flow of current in said portion of the control circuit when a voltage corresponding to the voltage supplied to the control circuit is impressed thereon, said last named means comprising a valvular gas-filled element, the control circuit also having associated therewith a capacity element adapted to absorb current supplied to the control circuit for a time interval, the length of the time interval being approximately inversely proportional to the value of the current in the supply circuit, whereby the voltage impressed on the valvular gas-filled element is less than that supplied to the control circuit for a time interval, and whereby the means responsive to the flow of current in the control circuit is operable after a time interval, the length of the time interval being approximately inversely proportional to the value of the current in the supply circuit.

27. In a device of the class described, a source of electric current, a supply circuit for bringing said current to electrodes, a control circuit, means responsive to the current in the supply circuit for producing a voltage effect in said control circuit substantially proportional to the current in the supply circuit, means associated with the control circuit and operable responsive to the flow of current in a portion of the control circuit to control the flow of current in the supply circuit, the control circuit having means associated therewith and normally preventing the flow of current in said portion of the control circuit, said means being operable to permit the flow of current in said portion of the control circuit when a voltage corresponding to the voltage supplied to the control circuit is impressed thereon, said last named means comprising a valvular gas-filled element, the control circuit also having associated therewith a capacity element adapted to absorb current supplied to the control circuit for a time interval, the length of the time interval being approximately inversely proportional to the value of the current in the supply circuit, whereby the voltage impressed on the valvular gas-filled element is less than that supplied to the control circuit for a time interval, and whereby the means responsive to the flow of current in the control circuit is operable after a time interval, the length of the time interval being approximately inversely proportional to the value of the current in the supply circuit, and means to adjustably vary the capacity of the capacity element.

28. In a device of the class described, a source of electric current, a supply circuit for bringing said current to electrodes, a control circuit, means responsive to the current in the supply circiut for producing a voltage effect in said control circuit substantially proportional to the current in the supply circuit, meant associated with the control circuit and operable responsive to the flow of current in a portion of the control circuit to control the flow of current in the supply circuit, the control circuit having means associated therewith and normally preventing the flow of current in said portion of the control circuit, said means being operable to permit the flow of current in said portion of the control circuit when a voltage corresponding to the voltage supplied to the control circuit is impressed thereon, said last named means comprising a valvular gas-filled element, the control circuit also having associated therewith a capacity element adapted to absorb current supplied to the control circuit for a time interval, and a resistance adapted to retard the rate of flow of current to the capacity element to increase the time interval during which the capacity element absorbs current, the length of the time interval being approximately inversely proportional to the value of the current in the supply circuit, whereby the voltage impressed on the valvular gas-filled element is less than that supplied to the control circuit for a time interval, and whereby the means responsive to the flow of current in the control circuit is operable after a time interval, the length of the time interval being approximately inversely proportional to the value of the current in the supply circuit.

29. The device described in claim 28 and which is characterized by means to adjustably vary the value of the resistance.

30. The device described in claim 28 and which is characterized by means to adjustably vary the capacity of the capacity element.

31. Apparatus for controlling the duration of current flow in a work-piece, comprising: means, responsive to a predetermined electro-motive-force, for effecting interruption of current flow to said work-piece; and means, controlled by the electrical condition of said work-piece, for applying electro-motive-force varying in the same sense as current through said work-piece to said responsive means, said controlled means including means for altering the effect of said electro-motive-force on said responsive means to said predetermined electro-motive-force, during a period of time dependent upon the electrical condition of said work-piece.

32. Apparatus for controlling the duration of current flow in a work-piece, comprising: means, responsive to a predetermined electro-motive-force, for effecting interruption of current flow to said work-piece; and means, controlled by the electrical condition of said work-piece, for rendering electro-motive-force available for transmission to said responsive means, said controlled means including means for retarding the building up of said transmitted electro-motive-force to said predetermined electro-motive-force for a period of time after said available electro-motive-force has reached a predetermined value.

33. Apparatus for controlling the duration of current flow in a work-piece, comprising: means, responsive to a predetermined electro-motive-force, for effecting interruption of current flow to said work-piece; and means, controlled by the electrical condition of said work-piece, for applying electro-motive-force to said responsive means, said controlled means including means for altering the effect of said electro-motive-force on said means responsive to said predetermined electro-motive-force, during a period of time dependent upon the current flow through said work-piece, said period of time being greater for small currents through said work-piece and less for large currents.

34. Apparatus for controlling the duration of current flow in a work-piece, comprising: normally non-conducting means rendered conductive when subjected to a predetermined electro-motive-force for effecting interruption of current flow to said work-piece; and means, controlled by the electrical condition of said work-piece, for applying electro-motive-force to said normally non-conducting means, said controlled means including means for altering the effect of said electro-motive-force on said normally non-conductive means to said predetermined electro-motive-force, during a period of time dependent upon the electrical condition of said work-piece, to thereby render said normally non-conductive means conductive to interrupt current flow to said work-piece, after a duration of time dependent upon the electrical condition of said work-piece.

35. Apparatus for controlling the duration of current flow in a work-piece, comprising: means, responsive to a predetermined electro-motive-force, for effecting interruption of current flow to said work-piece; means, controlled by the electrical condition of said work-piece, for applying electro-motive-force varying in the same sense as current through said work-piece to said responsive means, said controlled means including means for altering the effect of said electro-motive-force on said means responsive to said predetermined electro-motive-force during a period of time dependent upon the electrical condition of said work-piece; and means for varying the duration of said period of time.

36. Apparatus for controlling the duration of current flow in a work-piece, comprising: means operable to permit application of current to said work-piece, and responsive to a predetermined electro-motive-force for effecting interruption of current flow to said work-piece; means controlled by the electrical condition of said work-piece, for applying electro-motive-force to said responsive means, said controlled means including means for altering the effect of said electro-motive-force on said means responsive to said predetermined electro-motive-force, during a period of time dependent upon the electrical condition of said work-piece; and means operable, after said responsive means interrupts the flow of current to said work-piece, to de-energize said controlled means, whereby said responsive means operate to permit re-application of current to said work-piece.

37. Apparatus for controlling the duration of current flow in a work-piece, comprising: electrical energy accumulating means, controlled by the electrical condition of said work-piece, operable after accumulating a predetermined electrical charge to expend at least a portion of said accumulated charge, the duration of time for accumulating said predetermined charge being dependent upon the electrical condition of said work-piece; means operable to permit application of current to said work-piece, and responsive to said expending charge for effecting interruption of current flow to said work-piece; and means operable, after said responsive means interrupts the flow of current to said work-piece, to de-energize said accumulating means, whereby said responsive means operate to permit re-application of current to said work-piece.

DAVID C. WRIGHT.